W. H. HOVEY.
Tire Fastener.
No. 77,981.
Patented May 19, 1868.
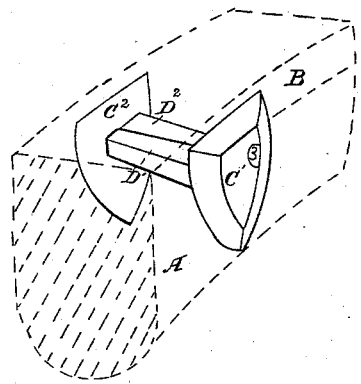

United States Patent Office.

WILLIAM H. HOVEY, OF HOLLY, MICHIGAN.

Letters Patent No. 77,981, dated May 19, 1868.

IMPROVEMENT IN THE MODE OF SECURING TIRES TO WHEELS.

*The Schedule referred to in these Letters Patent and making part of the same.*

TO WHOM IT MAY CONCERN:

Be it known that I, WILLIAM H. HOVEY, of Holly, in the county of Oakland, and State of Michigan, have invented a new and useful Improvement in the Mode of Securing the Tires of Carriages; and I do declare that the following is a true and accurate description thereof, reference being had to the accompanying drawings, and to the letters of reference marked thereon, and being a part of this specification.

The nature of my invention consists in providing the rim or felloe of a carriage-wheel, A, as shown in the drawings, with suitable transverse openings in the face of the same for receiving parallel bolts D, to which are attached heads, C C, provided with holes adjacent to the base of the bolts, for the admission of the point of the adjacent bolts.

Tire B, placed in position on rim A, and bolts D, inserted from opposite directions in the described groove prepared in rim for the same, under and near the tire, the point of $D^1$ passing through the hole provided for the same in head or plate $C^2$, and the point of $D^2$ passing through the corresponding hole provided for the same in plate or head $C^1$, in which position the ends or points of the bolts are riveted to the outer sides of the plates, as shown at 3, thereby forming and securing a perfect and rigid connection of the two bolts, and securing the tire to its proper position with the rim of the wheel.

What I claim as my invention, and desire to secure by Letters Patent, is—

The securing of tire B to rim A, by inserting between the same parallel bolts D D, provided with heads or plates C C, perforated to receive the ends of the bolts, and secured by riveting the same, substantially as described, and for the purposes set forth and shown.

WM. H. HOVEY.

Witnesses:
L. H. RIPLEY,
E. D. BUSSEY.